Patented Aug. 3, 1948

2,446,250

UNITED STATES PATENT OFFICE 2,446,250

STABILIZATION AND PURIFICATION OF ALKYL PHENOLS DERIVED FROM PETROLEUM

Royal L. Shuman, Newark, N. J., assignor to Celanese Corporation of America, a corporation of Delaware No Drawing. Application March 4, 1944, Serial No. 525,103

12 Claims. (Cl. 260—621)

This invention relates to the treatment of crude phenolic compounds, and ralates more particularly to the stabilization and purification of alkyl phenols (cresylic acids) extracted from petroleum naphtha made by the commercial cracking of crude petroleum.

The alkyl phenols extracted from petroleum have a boiling range of 180° C. to 290° C. or higher and are of the monohydric type. In the process of refining petroleum, four or five fractions are collected during the distillation and these are commercially available under different grade designations. The fractions distilling between 200° and 225° C. and between 220° and 250° C. are the ones with which the present invention is particularly concerned, since they are eminently suitable for the preparation of phosphoric acid esters, excellent plasticizers for cellulose derivatives, resins and other synthetic compounds. When commercially available alkyl phenols extracted from petroleum are reacted with phosphorus halides, such as phosphorus oxychloride, to synthesize phosphoric acid esters, such alkyl phenols decompose and discolor, and tarry substances are formed. Moreover, the phosphoric acid esters formed are highly colored and unstable and are not suitable for use in many products. The coloration and instability of the phosphoric acid esters are due to the presence in the alkyl phenols of many phenols which are unstable to phosphorus halides, as well as other undesirable substances such as sulfur-containing impurities, nitrogen bases, neutral oils, etc. It is, accordingly, an important object of this invention to provide an improved process for treating alkyl phenols (cresylic acids) extracted from petroleum so as to obtain alkyl phenols which when reacted with phosphorus halides produce stable phosphoric acid esters of good color.

Another object of this invention is the production of alkyl phenols (cresylic acids) extracted from petroleum which are free from phenols unstable to phosphorus halides, sulfur-containing impurities, nitrogen bases, etc.

Still another object of this invention is the production of stabilized and purified alkyl phenols (cresylic acids) obtained from petroleum which have the property of retaining their color after exposure to the air for twenty-four hours at room temperature, and of reacting with phosphorus oxychloride to produce without appreciable reaction discoloration phosphoric acid esters.

A further object of this invention is the preparation of phosphoric acid esters such as trialkyl phenol phosphates by reacting stabilized and purified alkyl phenols with phosporus halides, such as phosphorus oxychloride, which phosphoric acid esters have improved electrical resistance, higher viscosities, lower toxicity, and lower density than phosphoric acid esters made from coal tar alkyl phenols.

In accordance with the process of my invention, I treat petroleum alkyl phenols having a boiling range between 200° and 225° C. and between 220° and 250° C., from which water has been removed, with aluminum chloride by heating the reactants in a still at a reduced pressure of about 250 to 300 mm. mercury absolute, the temperature in the still being gradually increased to about 150° C. or more over a period of from 2 to 4 hours and the pressure being gradually increased to from 350 to 400 mm. mercury absolute. Any water produced during the treatment, as well as any volatile products, are distilled over and discarded. The pressure in the still is then reduced to 50 mm. mercury absolute or less and the heating is continued and the charge is distilled as rapidly as possible. The temperature during distillation should preferably not exceed 160° C. The amount of stabilized and purified alkyl phenols recovered from the charge is between 80 and 90% thereof, which alkyl phenols are highly satisfactory for use in making phosphoric acid esters.

The aluminum chloride employed in accordance with the present invention is preferably anhydrous and the amounts employed are from 1% to 10% and preferably from 1 to 3%, based on the weight of the alkyl phenols being treated.

For the purpose of further describing the invention and not as a limitation, the following examples are given:

*Example I*

5800 parts by weight of petroleum alkyl phenols (a mixture of cresylic acids) having a boiling range of 200° to 225° C. and a specific gravity of 1.023 at 20° C. are charged into a still fitted with a reflux column which is connected to a horizontal condenser and receiver. After removing any water present, 150 parts by weight of anhydrous aluminum chloride are added. The pressure in the still is reduced to 250 mm. mercury absolute and heat is applied. The temperature is gradually increased to 140° C. or more in a period of 2 to 3 hours and the pressure is gradually increased to 380 mm. mercury absolute. Any water produced during the treatment, as well as other volatile products, distill off and are discarded. The pressure is then reduced to 50 mm. mercury absolute, or less, heating is continued and the charge is distilled as rapidly as possible. The temperature during the distillation should not exceed 160° C. 85 to 90% of the charge satisfactory for use in making phosphoric acid esters is recovered.

The distillate is water white with a specific gravity of 1.028 at 20° C., a boiling range of 199 to 220° C., and will not discolor when mixed with phosphorus oxychloride and heated.

*Example II*

5000 parts by weight of petroleum alkyl phenols (a mixture of cresylic acids) having a boiling range of 220° to 245° C. and a specific gravity of 1.008 at 20° C. are charged into a still such as described in Example I. After removing any water present, 150 parts by weight of anhydrous aluminum chloride are added. The pressure in the still is reduced to 300 mm. mercury absolute and heat is applied. The temperature is increased to 150° C. over a period of 3 to 4 hours and the absolute pressure is gradually increased to 400 mm. mercury absolute. Any water produced during the treatment or other volatile products are distilled off and discarded. The pressure is then reduced to 50 mm. mercury absolute, or less, heating is continued and the charge is distilled as rapidly as possible. The temperature during the distillation should not exceed 160° C. 80 to 85% of the charge is recovered and is satisfactory for use in making phosphoric acid esters.

The distillate is light amber to water white in color with a specific gravity of 1.006 at 20° C., a boiling range of 223° C. to 241° C. and will not discolor when mixed with phosphorus oxychloride and heated.

The alkyl phenols (cresylic acids) made in accordance with the present invention are quite superior to those heretofore obtained from petroleum. For example, alkyl phenols heretofore obtained from petroleum even though they are freshly distilled and of light amber color to begin with will darken considerably when exposed to air for 24 hours at room temperature, an indication that they are unsuitable for synthesizing phosphoric acid esters. However, the alkyl phenols made in accordance with the present invention remain practically unchanged after exposure to the air for 24 hours at room temperature, i. e. they do not discolor. Moreover, the alkyl phenols heretofore obtained from petroleum discolor appreciably when three mols thereof are heated to 100° C. with one mol of phosphorus oxychloride, as in the preparation of phosphoric acid esters, whereas the alkyl phenols made in accordance with the present process show little or no discoloration when reacted in the same manner with phosphorus oxychloride.

The alkyl phenols extracted from petroleum after the treatment described in the foregoing may be reacted with phosphorus halides, particularly phosphorus oxychloride, in the same manner as phenols obtained from coal tar are reacted to produce phosphoric acid esters such as triphenyl phosphate, tricresyl phosphate, etc. The subsequent refining of the phosphoric acid esters by vacuum distillation, washing with dilute alkalies, and treatment with strong oxidizing agents such as potassium permanganate is also the same as used for the phosphoric acid esters made from coal tar phenols. The phosphoric acid esters produced with the stabilized and purified alkyl phenols prepared in accordance with this invention are highly satisfactory in use as plasticizers for cellulose derivatives, resins, and other synthetic products.

The alkyl phenols (cresylic acids) made in accordance with the present invention yield phosphoric acid esters of improved characteristics when reacted with phosphorus oxychloride, as compared with the phosphoric acid esters prepared from coal tar phenols having about substantially similar distillation ranges. Thus, they produce phosphoric acid esters of improved electrical qualities, as can be seen from the following comparisons:

| | Phosphoric Acid Ester made from— | Power Factor 60 cycles | Resistivity Ohms-cms. ×10⁴ |
|---|---|---|---|
| 1 | Coal tar alkyl phenols with a boiling point range of 200 to 210° C. and a specific gravity of 1.031 | .966 | 1,050 |
| 2 | Alkyl phenols obtained from petroleum and having a boiling point range of 200 to 210° C. (same as 1) | .795 | 2,750 |
| 3 | Alkyl phenols refined in accordance with Example I above and having a boiling point range of 200 to 220° C. | .55 | 6,500 |
| 4 | Alkyl phenols refined in accordance with Example II above and having a boiling point range of 220 to 240° C. | .21 | 21,200 |
| 5 | Coal tar alkyl phenols with a boiling point range of 215 to 225° C. | 1.00 | 127 |

Moreover, the alkyl phenols (cresylic acids) of the present invention yield phosphoric acid esters showing less toxicity than the phosphoric acid esters prepared from alkyl phenols (cresylic acids) of approximately the same boiling point range. Thus, for example, the phosphoric acid ester prepared from the alkyl phenols refined as in Example I above has been fed to chickens with the following results:

A single dose of 1 cc. of the phosphoric acid ester per kilogram of body weight did not show any effect whatsoever on chickens whereas 1 cc. of phosphoric acid esters made from coal tar alkyl phenols cause definite paralysis. Periodic feedings of small amounts after a long period show that at least 2.5 cc. per kilogram of body weight do not cause any paralysis, whereas with the phosphoric acid esters made from coal tar alkyl phenol 1 to 2 cc. produced definite symptoms of paralysis.

The viscosity of the phosphoric acid esters made from the alkyl phenols of the present invention are higher than the phosphoric acid esters made from coal tar alkyl phenols of approximately the same boiling point. For example, the viscosity at 20° C. of the phosphoric acid esters prepared from the alkyl phenols produced in accordance with Example I is about 800 centipoises as compared with the viscosity of about 100 centipoises for the phosphoric acid esters made from the coal tar alkyl phenols. This is a very important characteristic since phosphoric acid esters of higher viscosities are desirable when they are to be used in lubricating oils, and as air filtering mediums as well as in making plastic compositions. They also serve as good dispersing and wetting agents for the grinding of pigments.

The phosphoric acid esters made with the alkyl phenols of the present invention are less dense, i. e. lighter, than those made from coal tar alkyl phenols as will be seen from the following table.

| Phosphoric Acid Esters made from— | Specific Gravity 20° C./20° C. |
|---|---|
| 1  Coal tar alkyl phenols with a boiling point range of 200 to 210° C. and a specific gravity of 1.031 | 1.170 |
| 2  Alkyl phenols refined in accordance with Example I above and having a boiling point range of 200 to 220° C | 1.155 |
| 3  Alkyl phenols refined in accordance with Example II above and having a boiling point range of 220 to 240° C | 1.112 |

The plastic compositions made with the phosphoric acid esters prepared from the alkyl phenols of the present invention will tolerate or hold more of such phosphoric acid esters than the phosphoric acid esters prepared from coal tar alkyl phenols. For example, using ½ second R. S. pyroxylin, if 100 parts of phosphoric acid ester made from coal tar alkyl phenols are employed to obtain a certain degree of plasticity or softness, there can be used from 150 to 200 parts of the phosphoric acid ester of the present invention before reaching the same degree of tackiness or softness. Moreover, in paper coating this loading up of the formula with plasticizer without running into excessive tackiness is a highly desirable property inasmuch as the paper tends to absorb excess plasticizer.

It is to be understood that the foregoing detailed description is given merely by way of illustration and that many variations may be made therein without departing from the spirit of my invention.

Having described my invention, what I desire to secure by Letters Patent is:

1. In the process for the stabilization and purification of alkyl phenols obtained from petroleum, the steps of reacting such alkyl phenols free from water with anhydrous aluminum chloride at an elevated temperature and subatmospheric pressure and then distilling the reaction mixture whereby stabilized and purified alkyl phenols are obtained as distillates.

2. In the process for the stabilization and purification of alkyl phenols obtained from petroleum, the steps of reacting such alkyl phenols free from water with from 1 to 10%, based on the weight of the alkyl phenols, of anhydrous aluminum chloride at an elevated temperature and subatmospheric pressure and then distilling the reaction mixture whereby stabilized and purified alkyl phenols are obtained as distillates.

3. In the process for the stabilization and purification of alkyl phenols obtained from petroleum, the steps of reacting such alkyl phenols free from water with from 1 to 3%, based on the weight of the alkyl phenols, of anhydrous aluminum chloride at an elevated temperature and subatmospheric pressure and then distilling the reaction mixture whereby stabilized and purified alkyl phenols are obtained as distillates.

4. In the process for the stabilization and purification of alkyl phenols obtained from petroleum, the steps of reacting such alkyl phenols free from water with from 1 to 3%, based on the weight of the alkyl phenols, of anhydrous aluminum chloride at an elevated temperature and subatmospheric pressure for from 2 to 4 hours and then distilling the reaction mixture whereby stabilized and purified alkyl phenols are obtained as distillates.

5. Process for the stabilization and purification of alkyl phenols obtained from petroleum, which comprises heating a mixture of such alkyl phenols free from water with anhydrous aluminum chloride at subatmospheric pressure for from 2 to 4 hours while gradually increasing the temperature and subatmospheric pressure, then reducing the pressure and continuing the heating whereby stabilized and purified alkyl phenols are distilled over.

6. Process for the stabilization and purification of alkyl phenols obtained from petroleum, which comprises heating a mixture of such alkyl phenols free from water with anhydrous aluminum chloride at subatmospheric pressure for from 2 to 4 hours while gradually increasing the temperature to at least 140° C. and the pressure to at least 350 millimeters of mercury absolute, then reducing the pressure to about 50 millimeters of mercury absolute and continuing the heating at a temperature of at most 160° C. whereby stabilized and purified alkyl phenols are distilled over.

7. Process for the stabilization and purification of alkyl phenols obtained from petroleum, which comprises heating a mixture of such alkyl phenols free from water with 1 to 10%, based on the weight of the alkyl phenols, of anhydrous aluminum chloride at subatmospheric pressure for from 2 to 4 hours while gradually increasing the temperature and subatmospheric pressure, then reducing the pressure and continuing the heating whereby stabilized and purified alkyl phenols are distilled over.

8. Process for the stabilization and purification of alkyl phenols obtained from petroleum, which comprises heating a mixture of such alkyl phenols free from water with 1 to 10%, based on the weight of the alkyl phenols, of anhydrous aluminum chloride at subatmospheric pressure for from 2 to 4 hours while gradually increasing the temperature to at least 140° C. and the pressure to at least 350 millimeters of mercury absolute, then reducing the pressure to about 50 millimeters of mercury absolute, and continuing the heating at a temperature of at most 160° C. whereby stabilized and purified alkyl phenols are distilled over.

9. Process for the stabilization and purification of alkyl phenols obtained from petroleum, which comprises heating a mixture of such alkyl phenols free from water with 1 to 3%, based on the weight of the alkyl phenols, of anhydrous aluminum chloride at subatmospheric pressure for from 2 to 4 hours while gradually increasing the temperature and subatmospheric pressure, then reducing the pressure and continuing the heating whereby stabilized and purified alkyl phenols are distilled over.

10. Process for the stabilization and purification of alkyl phenols obtained from petroleum, which comprises heating a mixture of such alkyl phenols free from water with 1 to 3%, based on the weight of the alkyl phenols, of anhydrous aluminum chloride at subatmospheric pressure for from 2 to 4 hours while gradually increasing the temperature to at least 140° C. and the pressure to at least 350 millimeters of mercury absolute, then reducing the pressure to about 50 millimeters of mercury absolute, and continuing heating at a temperature of at most 160° C. whereby stabilized and purified alkyl phenols are distilled over.

11. Process for the stabilization and purification of alkyl phenols obtained from petroleum, which comprises treating a mixture of such alkyl phenols free from water with anhydrous aluminum chloride by heating said mixture at a subatmospheric pressure of about 250 millimeters of mercury absolute and continuing the heating for from 2 to 4 hours while gradually increasing the temperature to at least 140° C. and the pressure to at least 350 millimeters of mercury absolute, then reducing the pressure to about 50 millimeters of mercury absolute and continuing the heating at a temperature of at most 160° C. whereby stabilized and purified alkyl phenols are distilled over.

12. Process for the stabilization and purification of alkyl phenols obtained from petroleum, which comprises treating a mixture of such alkyl phenols free from water with 1 to 3%, based on the weight of the alkyl phenols, of anhydrous aluminum chloride by heating said mixture at a subatmospheric pressure of about 250 millimeters of mercury absolute and continuing the heating for from 2 to 4 hours while gradually increasing the temperature to at least 140° C. and the pressure to at least 350 millimeters of mercury absolute, then reducing the pressure to about 50 millimeters of mercury absolute and continuing the heating at a temperature of at most 160° C. whereby stabilized and purified alkyl phenols are distilled over.

ROYAL L. SHUMAN.

REFERENCES CITED

The following references are of record in the file of this patent:

UNITED STATES PATENTS

| Number | Name | Date |
|---|---|---|
| 1,958,210 | Scott | May 8, 1934 |
| 2,030,690 | Downs | Feb. 11, 1936 |
| 2,113,951 | Shuman | Apr. 12, 1938 |
| 2,134,547 | Buc | Oct. 25, 1938 |
| 2,228,366 | Rumscheidt | Jan. 14, 1941 |
| 2,301,270 | Gerlicher | Nov. 10, 1942 |
| 2,334,691 | Andersen | Nov. 23, 1943 |